United States Patent [19]

Mushiake et al.

[11] Patent Number: 5,409,588
[45] Date of Patent: Apr. 25, 1995

[54] ELECTROCHEMICAL CELL DIAPHRAGM AND AN ELECTROCHEMICAL CELL

[75] Inventors: Naofumi Mushiake; Takayuki Wani; Hiroshi Kato; Takeshi Sagara; Fumihiro Sasaki, all of Okayama, Japan

[73] Assignee: Japan GORE-TEX, Inc., Japan

[21] Appl. No.: 83,158

[22] Filed: Jun. 25, 1993

[51] Int. Cl.⁶ .................................................. C25C 7/04
[52] U.S. Cl. ..................................... 204/252; 204/296; 428/316.6; 428/422; 428/516; 429/62; 429/144; 429/145
[58] Field of Search ............................... 204/252, 296; 428/316.6, 421, 422, 516; 429/62, 144, 145

[56] References Cited

U.S. PATENT DOCUMENTS

| | | | |
|---|---|---|---|
| 3,953,566 | 4/1976 | Gore | 264/288 |
| 4,604,170 | 8/1986 | Miyake et al. | 204/296 |
| 4,650,730 | 3/1987 | Lundquist et al. | 429/62 |
| 4,822,700 | 4/1989 | Doddapaneni et al. | 429/50 |
| 4,863,815 | 9/1989 | Chang et al. | 429/94 |
| 4,886,715 | 12/1989 | McCullough, Jr. et al. | 429/103 |
| 4,891,107 | 1/1990 | Dong et al. | 204/296 |
| 5,130,024 | 7/1992 | Fujimoto et al. | 210/500.36 |
| 5,183,545 | 2/1993 | Branca et al. | 204/252 |

FOREIGN PATENT DOCUMENTS

| 0201875 | 5/1986 | European Pat. Off. |
| 19216 | 6/1973 | Japan |

OTHER PUBLICATIONS

Abstract: vol. 16, No. 389 (E-1250) 19 Aug. 1990 & JP-A-41 26 353 (Nitto Denko).

*Primary Examiner*—John Niebling
*Assistant Examiner*—Edna Wong
*Attorney, Agent, or Firm*—Gary A. Samuels

[57] ABSTRACT

A porous composite material for diaphragms for high-output electrochemical cells such as lithium cells. The material is a layered structure of fluoropolymer and polyolefin that provides a shut-down capability that safeguards against dangerous failure of the cell, such as a rupture or fire that may result from a short-circuit or other high-rate electric discharge.

10 Claims, No Drawings

ELECTROCHEMICAL CELL DIAPHRAGM AND AN ELECTROCHEMICAL CELL

FIELD OF THE INVENTION

This invention relates to electrochemical cells, more specifically to diaphragms for high-output electrochemical cells in which alkali metals and compounds are used.

BACKGROUND OF THE INVENTION

Devices that directly convert chemical energy into electric energy are known alternatively as electrochemical cells, galvanic cells, or batteries. These cells, referred to herein simply as cells, consist of a positive electrode and a negative electrode immersed in, or in contact with, an electrically-conductive medium called the electrolyte. The electrodes are generally separated by a porous diaphragm, also called a separator, which is ususally made of an electrically-insulating material.

The cell diaphragms should be thin, yet must have good mechanical strength in order to withstand handling during manufacture and use. In the past, paper, synthetic polymer resin impregnated paper, textile fiber cloth, non-woven cloth, and the like have been used as diaphragm materials. More recently, porous membranes of polypropylene are widely used as a diaphragm material. The presence of electrolyte in the pores of the diaphragm provides a path for ionic transfer of electrons, from one electrode to the other. This chemical transfer of energy occurs when the external circuit to which the cell is connected is closed, and the cell is called on to provide electricity.

In high energy density cells, in particular those in which lithium metal or lithium compounds are used, continuous high-rate or short-circuit discharges can lead to serious safety problems. The excessive heat generated by the high-rate discharge can create extremely high internal pressures and temperatures in the cell which may result in an explosion, or melting and ignition of lithium which may result in a fire. Such problems have been known to occur in, for example, cylindrical lithium cells for use in cameras. These cells consist of a thin porous diaphragm inserted between positive and negative electrodes which are spirally wound so that substantial electrode surface area capable of high energy output is created in the small volume of the device.

To prevent such occurrences, diaphragms having a shut-down function intended to interrupt the chemical reaction in the cell and prevent generation of excessive heat during high-rate discharge have been developed. The porous diaphragm melts and flows at a temperature lower than the melt point of lithium (about 180° C.), thus causing the pores to be blocked, and shutting down the chemical reaction generating the heat. Polypropylene diaphragms are used for shut-downs desired at about 140° C. and polyethylene diaphragms used for shut-downs desired at about 120° C.

A problem with such diaphragms, however, is that when too much heating occurs the diaphragm melts and flows excessively, and sags or tears away from between the electrodes. Thus, a short circuit across the gaps in the diaphragm can be established between the electrodes, leading to generation of additional heat and eventual outbreak of fire.

SUMMARY OF THE INVENTION

This invention provides a diaphragm for a high energy density cell which, when exposed to heat generated in high-rate discharge or short circuit situations, establishes and maintains a barrier that shuts down the electrochemical reaction in the cell.

The invention provides a composite porous material for a diaphragm of an electrochemical cell comprising a layer of porous fluoropolymer film in laminar arrangement with a layer of thermoplastic synthetic polymer film having a melt temperature lower than the melt temperature of the fluoropolymer film.

A preferred embodiment of the invention is a porous composite diaphragm material for a high energy density alkaline cell which comprises a porous polytetrafluoroethylene membrane laminated to a porous polyolefin membrane. In normal use it serves as the porous separator between the positive and negative electrodes of the high-output cell and permits the electrochemical reactions occurring at the electrodes to continue. However, in short-circuit or high-rate discharge situations that generate a dangerously high temperature in the cell, the diaphragm of the invention provides a shut-down function that interrupts the electrochemical reaction and permits the cell to cool to a safe temperature, thus preventing a fire or explosion. This is accomplished in the following manner:

As the temperature in the cell rises to above the melt temperature of the porous polyolefin membrane, the polyolefin membane melts and flows to form a continuous non-porous barrier that shuts down the electrochemical reaction. The non-porous polyolefin barrier is formed on the porous polytetrafluoroethylene membrane to which it is adhered. The melted polyolefin is prevented from sagging or flowing away from between the electrodes by the porous polytetrafluoroethylene membrane which has a melt temperature much higher than that of the polyolefin membrane, and which serves as a framework or lattice that holds the melted polyolefin in place within its pores, thus maintaining a continuous non-porous barrier between the electrodes, preventing an internal short-circuit between the electrodes from being established, and shutting down the electrochemical reaction.

The invention also includes a method to make the porous composite material of the diaphragm comprising the steps of:
 (i) forming a solution of 1 to 30 weight percent of a polyolefin in a solvent,
 (b) coating at least one side of a porous fluoropolymer film with said solution,
 (c) removing said solvent from said coating solution, thereby forming a composite material of a porous polyolefin layer adhered to said fluoropolymer film, and
 (d) treating said composite material with a hydrophilic substance whereby the external and internal surfaces become hydrophilic.

The invention further includes an electrochemical cell in which the porous composite material of the diaphragm comprises a layer of porous fluoropolymer film in laminar arrangement with a porous thermoplastic synthetic polymer film.

DETAILED DESCRIPTION OF THE INVENTION

The fluoropolymer to form the higher melt-temperature membrane of the porous composite diaphragm material of the invention can be selected from among many fluorocarbon-based polymers that can provide the strength, flexibility, fabricability, chemical resistance, and high temperature service desired in the diaphragm of the invention. Examples of suitable fluoropolymers include, but are not limited to, polyvinylfluoride, polyvinylidene fluoride, polytrifluorochloroethylene, tetrafluoroethylene/(perfluoroalkyl) vinyl ether copolymer, tetrafluoroethylene/hexafluoropropylene copolymer, and polytetrafluoroethylene. Preferably the porous high melt-temperature membrane is made of polytetrafluoroethylene, more preferably expanded polytetrafluoroethylene.

The fluoropolymer membrane should have a maximum pore size in the range 0.01 to 0.5 micrometers, preferably in the range 0.01 to 0.25 micrometers (as determined by Bubble Point Measurement). The pore volume should be in the range 5 to 95 percent, preferably in the range 20 to 80 percent. A maximum pore size less than 0.01 micrometers results in difficulty in fully impregnating the interior of the membrane with an electrolyte solution. A maximum pore size greater than 0.5 micrometers may result in excessive diffusion of active material or reaction products. A pore volume less than 5 percent results in an inadequate supply of electrolyte retained in the membrane, and a pore volume greater than 95 percent results in a membrane with inadequate mechanical strength. Expanded polytetrafluoroethylene membranes having suitable properties can be made using the method of expanding taught in U.S. Pat. No. 3,953,566 to Gore, incorporated herein by reference.

The thermoplastic synthetic polymer to form the lower melt-temperature membrane of the porous composite diaphragm material can be selected from among thermoplastic polymers that can provide the strength, flexibility, fabricability, chemical resistance, and low temperature melting characteristics desired in the diaphragm of the invention. Polyolefin polymers are preferred, most preferably polyethylene or polypropylene. Polyethylene or polypropylene of different densities and molecular weights may be used singly, or in combination, to form the porous low melt-temperature membrane of the composite diaphragm material of the invention. For example, low density polyethylene, high density polyethylene, ultra high molecular weight polyethylene, and the like, may be used alone or in a blend as the material of the porous polyolefin layer.

The porous polyolefin membrane should have a maximum pore size in the range 0.01 to 10 micrometers, preferably in the range 0.01 to 0.5 micrometers (as determined by microscopic examination of a portion of the surface). A maximum pore size less than 0.01 micrometers results in difficulty in fully impregnating the interior of the membrane with an electrolyte solution. A maximum pore size greater than 10 micrometers may result in excessive diffusion of active material or reaction products and, furthermore, leads to inadequate coverage or blockage of the pores of the fluoropolymer membrane when the polyolefin melts. The pore volume should be in the range 5 to 95 percent, preferably in the range 20 to 80 percent. A pore volume less than 5 percent results in an inadequate supply of electrolyte retained in the membrane, and a pore volume greater than 95 percent results in a membrane with inadequate mechanical strength.

There is a correlation between the thickness and pore volume of the porous polyolefin membrane that should be met in order to provide a sufficiency of melted polyolefin to completely block the pores of the porous fluoropolymer membrane when the melt down temperature is reached. In the following formula, A represents the thickness of a solid sheet formed from the melted porous polyolefin membrane:

$$A = \text{porous thickness[um]} \times (100 - \text{pore volume[\%]})/100$$

The value $A > 1$ should be obtained from the relationship of thickness to pore volume of the porous polyolefin membrane in order to provide sufficient melted polyolefin to form a continuous non-porous barrier on the porous fluoropolymer membrane of the composite diaphragm material, and shut down the electrochemical reaction in a cell. When A is 1 or less, an inadequate amount of melted polyolefin is available for this purpose.

A porous film containing a mixture of a polyolefin and inorganic fine powder (such as calcium carbonate or barium sulfate) can be used as the porous low melt-temperature membrane. However, it is preferred that the porous low melt-temperature membrane be a polyolefin film free of inorganic powder. Many commercially available porous polyolefin membranes can be used in forming the composite diaphragm material of the invention. For example, porous polyolefin membranes formed by a solution casting method, or by a method such as stretching or drawing a non-porous polyolefin film to form the pores may be used. Uniaxially stretched porous polyolefin film is preferred to bi- or multi-axially stretched film for use in cells with electrodes arranged in high length to width ratio configurations, such as in certain spiral configurations. A porous uniaxially stretched membrane will have a minimal tendency to shrink in the direction normal to the stretch direction. Consequently, when placed between two electrodes to form a cell, the stretch direction of the uniaxially stretched membrane should be oriented in the long direction of the electrodes, thus preventing shrinkage from occurring across the facing surfaces of the electrodes.

The porous fluoropolymer membrane and porous polyolefin membrane can be combined to form the composite diaphragm material of an electrochemical cell simply by placing them together in laminar arrangement and sandwiching them between the electrodes of a cell. However, in the interests of handling and fabricability, it is much more desirable to adhere them together to form a laminated composite material that can be treated as a single unit.

Lamination of the porous fluoropolymer membrane to the porous polyolefin membrane to form the composite diaphragm material can be done using conventional methods, equipment, and materials well known in the art. For example, adhesives may be used, however, care must be exercised in selecting an adhesive, which must be compatible with the electrolyte materials to which it will be exposed. The electrolyte material may contain an acid, alkali, organic solvent, or other harsh material. The adhesives must be applied to a surface to be laminated in a non-continuous manner, for example, by printing or spraying methods, to minimize blocking the pores of the membranes. The porous membranes can then be joined using standard lamination equipment.

A preferred method of lamination is to adhere the porous fluoropolymer membrane to the porous polyolefin membrane by thermal fusion techniques. In this method lamination is effected by simultaneous application of heat and pressure to the layered porous materials to be joined. This can also be done using conventional equipment and methods, for example, with a heated platen press, or by nipping the layered porous materials between a heated metal-surface roll and a silicone rubber-surface roll, or the like.

The most preferred method to prepare the composite diaphragm material of the invention is a method whereby a porous polyolefin layer is formed in place and adhered to at least one side of a porous fluoropolymer membrane. In this method the polyolefin is dissolved in a solvent to form a solution; the solution is coated on at least one side of the porous fluoropolymer membrane; and the solvent is removed thereby forming a porous polyolefin layer adhered to the porous fluoropolymer membrane. If desired, the composite material can be subsequently stretched to adjust the porosity. The method is described in greater detail below.

First, the polyolefin is dissolved in a suitable solvent. No particular limitations as to solvent selection are imposed as long as it completely dissolves the polyolefin. Xylene, decalin, nonane, decane, undecane, and the like can be used, for example. Heat and stirring may be used to facilitate dissolving the polyolefin. The mixing temperature will vary depending on the solvent, type of polyolefin, and concentration of the polyolefin in the solution. The mixing temperature should be in the range 80° C. to 250° C. The concentration of the polyolefin in the solution will also vary depending on the polyolefin used but should be in the range 1 to 30 weight percent, preferably in the range 2 to 15 weight percent. With a solution concentration of less than 1 weight percent a porous polyolefin layer can be formed on the porous fluoropolymer membrane, but there is not enough polyolefin present to melt and block the pores of the porous fluoropolymer membrane and bring about the shutdown function. With a solution concentration in excess of 30 weight percent it is difficult to prepare a uniform solution and, furthermore, the amount of polyolefin applied to the porous fluoropolymer membrane cannot be controlled to produce a layer of the desired thinness.

The polyolefin solution can be applied to one or both sides of the porous fluoropolymer membrane by conventional methods. For example, the porous fluoropolymer membrane can be immersed in the solution or, the solution can be extruded through a coating die on to the surface of the porous fluoropolymer membrane. The polyolefin solution can also be applied to the porous fluoropolymer membrane by printing, spraying, rollcoating, or other standard methods.

The polyolefin solution solvent is then removed and a porous polyolefin layer is formed and adhered to the porous fluoropolymer membrane. This can be done by one or a combination of methods which aid in the formation of porosity in the polyolefin layer. One method is to evaporate the solvent using standard air- or oven-drying techniques.

Another method is to introduce a higher boiling solvent into the polyolefin solution on the fluoropolymer membrane, after which drying proceeds by standard techniques. The higher boiling solvent is less volatile than the polyolefin solution solvent, is miscible with the solution solvent, but has no, or very low, solubility for the polyolefin. The higher boiling solvent can be introduced into the polyolefin solution at any time, for example, at the mixing stage of the solution or later, such as by immersing the fluoropolymer membrane coated with the polyolefin solution into the higher boiling solvent. The higher boiling solvent can also be added in controlled quantities at the surface of the polyolefin solution on the fluoropolymer membrane as drying proceeds. As the solution solvent is dried from the polyolefin solution, the less volatile higher boiling solvent remains behind and the dissolved polyolefin coagulates to form a porous structure around the spaces occupied by the higher boiling solvent. An example of a suitable combination of solvents is xylene, as the polyolefin solution solvent, and DMSO (dimethylsulfoxide) as the higher boiling solvent. The residual higher boiling solvent in the porous layer can be then removed by continued drying, by drying at a higher temperature, or by solvent extraction methods. Solvents which can be used as extraction solvents include hydrocarbons such as pentane, hexane, heptane, and the like; chlorinated hydrocarbons such as methylene chloride, carbon tetrachloride, and the like; fluorinated hydrocarbons such as trifluoroethane and the like; ethers such as dioxane, diethyl ether, and the like; and alcohols such as methanol, ethanol, propanol, and the like. These solvents are selected as desired depending on the solvent used to dissolve the polyolefin and can be used independently or in combination.

The porous layer of polyolefin thus formed is, as part of the process, firmly adhered to the porous fluoropolymer membrane. Furthermore, the process permits solvent removal from both sides of the polyolefin solution, through the porous fluoropolymer membrane on which it is cast as well as from the top surface, thus creating a more uniform pore structure and a greater number of interconnected pores in the polyolefin layer. This method has the further advantage of eliminating the lamination step required to join separate porous membranes, thus providing substantial cost savings.

It will be understood that the nature of the porous polyolefin layer formed on the porous fluoropolymer membrane i.e., its thickness, pore size, pore volume, and the like, are related to the type of polyolefin, type of solvent or solvent mixture, concentration of polyolefin in the solution, solvent removal method, and the like. Therefore, some experimentation may be needed in combining them.

The porosity of the composite material described above can be further adjusted, if desired, by uniaxially or biaxially stretching the composite material. The stretching should be done at a temperature lower than, but within about 10° C. of the melt temperature of the polyolefin. At a temperature lower than 10° C. below the melt temperature the porous polyolefin layer may be mechanically damaged or destroyed; and at a temperature above the melt temperature, the polyolefin will melt and the porous structure will be lost.

The porous composite materials for a diaphragm for an electrochemical cell of the invention made according to the descriptions above comprise a porous fluoropolymer membrane which is water repellent, and a porous polyolefin layer, which is also not readily wet with water. Therefore, when the porous composite material is to be used as a diaphragm in a cell in which an aqueous electrolyte solution is required, the composite material must be treated to make it hydrophilic. A hydrophilizing treatment of the porous composite material is preferred even when the composite material is to be used in a cell in which a non-aqueous electrolyte solution is used, such as in a lithium cell, as the treatment will also make the composite material more readily wettable by the non-aqueous electrolyte solution. Conventional methods in which the inner surfaces of the pores of the porous composite material are coated with a hydrophilizing agent, such as a surfactant, can be used. However, there is a possibility that surfactant materials having a harmful effect on cell performance may be eluted in the electrolyte solution, so adequate precautions are required. A preferred hydrophilizing treatment not likely to elute materials harmful to cell performance is disclosed in U.S. Pat. No. 5,130,024 to Fujimoto et al, incorporated herein by reference. The hydrophilizing agent is a hydrophilic copolymer made by copolymerizing a fluorine-containing ethylenically unsaturated monomer and a non-fluorinated vinyl monomer containing a hydrophilic group. The hydrophilizing treatment can be given to the porous materials before or after they have been joined to form the porous composite material of the invention.

The porous composite material for a diaphragm for an electrochemical cell of the invention is well suited for use in cells involving use of an alkali metal or alkali metal compound, in particular, in lithium cells for which additional safeguards against catastrophic failure, such as an explosive rupture or fire brought on by a short-circuit or other high rate discharge, has been sought. Although polytetrafluoroethylene and other fluoropolymers are known to be unstable in contact with hot alkali metals, the porous composite diaphragm material of the invention can be safely used when the porous polyolefin side of the composite material faces the alkali metal.

The porous composite diaphragm material of the invention provides an operating safeguard against such catastrophic failure in a lithium cell. As the internal temperature of the cell reaches the melt temperature of the porous polyolefin layer, the polyolefin melts and flows together so as to form a continuous non-porous barrier between the electrodes which interrupts the electrochemical reaction generating the heat and permits the cell to cool. At the same time, the porous fluoropolymer membrane on which the polyolefin barrier is adhered, and which has a much higher melt temperature than the polyolefin layer, remains intact and provides a framework or lattice that can hold the molten polyolefin barrier in place for a long period of time at temperatures up to about 200° C. Thus, the melted polyolefin is prevented from tearing, sagging or flowing away from between the electrodes and, consequently, internal short-circuits between the electrodes are prevented from being established, the electrochemical reaction is shut down, and the cell cools without catastrophic failure.

TEST DESCRIPTIONS

SHORT-CIRCUIT TEST

An external short-circuit is created between the electrodes of sample cells by application of a load having an initial resistance of 10 milliohms. The load is continued until a successful shut-down occurs or a shut-down failure occurs.

The cell temperature at shut-down is measured and recorded, and the number of cells which rupture or catch fire as a result of failure to maintain and continue a safe shut-down state is reported.

CHARGE-DISCHARGE TEST

The cell is discharged to a discharge depth of 50% under an electric load such that the cell temperature is about 25° C., after which it is recharged to capacity and the cycle repeated. Charge-discharge cycling is continue until internal short circuiting or other failure caused by repeated charging and discharging occurs. The number of charge-discharge cycles to failure is reported.

EXAMPLE 1

Diaphragm

A porous composite diaphragm material was made from a porous drawn polypropylene membrane having a thickness of 25 micrometers, a maximum pore size of 0.25 micrometers, and a pore volume of 45 percent, and a porous expanded polytetrafluoroethylene membrane having a thickness of 10 micrometers, a maximum pore size of 0.25 micrometers, and a pore volume of 80 percent. The porous membranes were laminated by application of heat and pressure between a metal-surface hot roll and a silicone rubber-surface roll. The temperature of the hot roll was 135° C.

Hydrophilization Treatment

The porous composite diaphragm material was treated to make it hydrophilic in accordance with the method disclosed in U.S. Pat. No. 5,130,024. The hydrophilizing agent was a tetrafluoroethylenevinyl alcohol copolymer (100% saponified; 27 wt. % fluorine content; 14.5 millimol/gram hydroxyl group content) dissolved in 1 liter of methanol at a concentration of 0.2 wt. %. The porous composite diaphragm material was impregnated with the methanol solution by immersion in the solution, fixed to a drying frame, and dried for 5 minutes at a temperature of 60° C. The impregnation and drying steps were repeated 3 times to complete the hydrophilization treatment.

Cell

Test cells having electrodes in a spiral configuration were made. The treated porous composite diaphragm material was interposed between positive electrode material of manganese dioxide and negative electrode material of lithium metal with the porous polypropylene membrane in contact with the lithium metal electrode. The assembly was formed into a spiral configuration and manufacture of a cylindrical lithium cell completed by conventional methods. The electrolyte solution was a propylenecarbonate:1,2-dimethoxyethane (1:1) solution containing $LiClO_4$ (0.5M/liter).

COMPARATIVE EXAMPLE 1

Cylindrical lithium cells were made as comparative examples as described above as except that a porous stretched polypropylene membrane having a thickness of 35 micrometers, a maximum pore size of 0.25 micrometers, and a pore volume of 45 percent was used as the diaphragm. The diaphragm material of the comparative example was treated to make it hydrophilic as described above.

Testing

The short-circuit test described hereinabove was given to 1000 cells each made according to Example 1 and Comparative Example 1. The test results are as follows:

| Example | Shut-down Temperature | Failure rate |
| --- | --- | --- |
| Example 1 | 142° C. | 0% |
| Comp. Example 1 | 142° C. | 0.5% |

EXAMPLE 2

Diaphragm

A porous composite diaphragm material was made from a porous drawn polyethylene membrane having a thickness of 25 micrometers, a maximum pore size of 0.30 micrometers, and a pore volume of 45 percent, and a porous expanded polytetrafluoroethylene membrane having a thickness of 10 micrometers, a maximum pore size of 0.30 micrometers, and a pore volume of 80 percent. The porous membranes were laminated by application of heat and pressure between a metal-surface hot roll and a silicone rubber-surface roll. The temperature of the hot roll was 115° C.

Hydrophilization Treatment

The porous composite diaphragm material was treated as described in Example 1.

Cell

Test cells having electrodes in a spiral configuration were made. The treated porous composite diaphragm material was interposed between positive electrode material of manganese dioxide and negative electrode material of lithium metal with the porous polyethylene membrane in contact with the lithium metal electrode. The assembly was formed into a spiral configuration and manufacture of a cylindrical lithium cell completed by conventional methods. The electrolyte solution was a propylenecarbonate:1,2-dimethoxyethane (1:1) solution containing $LiClO_4$ (0.5M/liter).

COMPARATIVE EXAMPLE 2

Cylindrical lithium cells were made as comparative examples as described above as except that a porous stretched polyethylene membrane having a thickness of 35 micrometers, a maximum pore size of 0.30 micrometers, and a pore volume of 45 percent was used as the diaphragm. The diaphragm material of the comparative example was treated to make it hydrophilic as described in Example 1 above.

Testing

The short-circuit test described hereinabove was given to 1000 cells each made according to Example 2 and Comparative Example 2. The test results are as follows:

| Example | Shut-down Temperature | Failure rate |
| --- | --- | --- |
| Example 2 | 121° C. | 0% |
| Comp. Example 2 | 121° C. | 0.9% |

EXAMPLE 3

Diaphragm

A porous composite diaphragm material was made from a porous drawn polypropylene membrane having a thickness of 15 micrometers, a maximum pore size of 0.25 micrometers, and a pore volume of 45 percent, and a porous expanded polytetrafluoroethylene membrane having a thickness of 10 micrometers, a maximum pore size of 0.25 micrometers, and a pore volume of 80 percent. The porous membranes were laminated by application of heat and pressure between a metal-surface hot roll and a silicone rubber-surface roll. The temperature of the hot roll was 135° C.

Hydrophilization Treatment

The porous composite diaphragm material was treated as described in Example 1.

Cell

Test cells having electrodes in a spiral configuration were made. The treated porous composite diaphragm material was interposed between positive electrode material of lithium cobaltate ($LiCoO_2$) and negative electrode material of lithium-carbon with the porous polypropylene membrane in contact with the lithium-carbon electrode. The assembly was formed into a spiral configuration and manufacture of a cylindrical lithium cell completed by conventional methods. The electrolyte solution was a propylenecarbonate:1,2-dimethoxyethane (1:1) solution containing $LiClO_4$ (0.5M/liter).

COMPARATIVE EXAMPLE 3

Cylindrical lithium cells were made as comparative examples as described above as except that a porous stretched polypropylene membrane having a thickness of 25 micrometers, a maximum pore size of 0.25 micrometers, and a pore volume of 45 percent was used as the diaphragm. The diaphragm material of the comparative example was treated to make it hydrophilic as described in Example 1 above.

Testing

The short-circuit test described hereinabove was given to 1000 cells each made according to Example 3 and Comparative Example 3. The test results are as follows:

| Example | Shut-down Temperature | Failure rate |
| --- | --- | --- |
| Example 3 | 142° C. | 0% |
| Comp. Example 3 | 142° C. | 0.4% |

EXAMPLE 4

Diaphragm

A porous composite diaphragm material was made from a porous drawn polyethylene membrane having a thickness of 25 micrometers, a maximum pore size of 0.30 micrometers, and a pore volume of 45 percent, and a porous expanded polytetrafluoroethylene membrane having a thickness of 50 micrometers, a maximum pore size of 0.30 micrometers, and a pore volume of 80 percent. The porous membranes were laminated by application of heat and pressure between a metal-surface hot roll and a silicone rubber-surface roll. The temperature of the hot roll was 115° C.

Hydrophilization Treatment

The porous composite diaphragm material was treated as described in Example 1.

Cell

Test cells having electrodes in a spiral configuration were made. The treated porous composite diaphragm material was interposed between positive electrode material of nickelic hydroxide and negative electrode material of cadmium metal. The assembly was formed into a spiral configuration and manufacture of a cylindrical nickel-cadmium cell completed by conventional methods. The electrolyte solution was 30% potassium hydroxide.

COMPARATIVE EXAMPLE 4

Cylindrical nickel-cadmium cells were made as comparative examples as described above as except that a porous non-woven cloth of Nylon 6/6 having a thickness of 75 micrometers was used as the diaphragm.

Testing

A cell made according to Example 4 and a cell made according to Comparative Example 4 were given the charge-discharge test described hereinabove.

The sample of Example 4 failed after about 4000 cycles, and the sample of Comparative Example failed after about 3000 cycles.

EXAMPLE 5

Diaphragm

A porous composite diaphragm material was made as follows:

Polypropylene was dissolved in a mixed solvent of xylene and DMSO (9:1) at a solution temperature of 120° C. and a solution containing 2 wt. % polypropylene was obtained. The solution was applied to only one side of a porous expanded polytetrafluoroethylene membrane having a thickness of 15 micrometers, a maximum pore size of 0.25 micrometers, and a pore volume of 60 percent. The porous expanded polytetrafluoroethylene membrane coated with the solution was dried in air at a temperature of 60° C. to remove the solvent. The resulting product was then immersed in ethanol, all the solvent was extracted, and the product was dried in air at a temperature of 80° C. A layer of polypropylene 10 micrometers thick was thus formed in place and adhered to the porous expanded polytetrafluoroethylene membrane and a porous composite diaphragm material was produced.

Hydrophilization Treatment

The porous composite diaphragm material was treated as described in Example 1.

Cell

Test cells having electrodes in a spiral configuration were made. The treated porous composite diaphragm material was interposed between positive electrode material of manganese dioxide and negative electrode material of lithium metal with the porous polypropylene membrane in contact with the lithium metal electrode. The assembly was formed into a spiral configuration and manufacture of a cylindrical lithium cell completed by conventional methods. The electrolyte solution was a propylenecarbonate:1,2-dimethoxyethane (1:1) solution containing LiClO$_4$ (0.5M/liter).

COMPARATIVE EXAMPLE 5

Cylindrical lithium cells were made as comparative examples as described above as except that a porous stretched polypropylene membrane having a thickness of 25 micrometers, a maximum pore size of 0.25 micrometers, and a pore volume of 45 percent was used as the diaphragm. The diaphragm material of the comparative example was treated to make it hydrophilic as described in Example 1 above.

Testing

The short-circuit test described hereinabove was given to 1000 cells each made according to Example 2 and Comparative Example 2. The test results are as follows:

| Example | Shut-down Temperature | Failure rate |
| --- | --- | --- |
| Example 5 | 142° C. | 0% |
| Comp. Example 5 | 142° C. | 0.5% |

EXAMPLE 6

Diaphragm

A porous composite diaphragm material was made as follows:

Low density polyethylene was dissolved in a mixed solvent of xylene and DMSO (9:1) at a solution temperature of 120° C. and a solution containing 2 wt. % polyethylene was obtained. The solution was applied to only one side of a porous expanded polytetrafluoroethylene membrane having a thickness of 15 micrometers, a maximum pore size of 0.25 micrometers, and a pore volume of 60 percent. The porous expanded polytetrafluoroethylene membrane coated with the solution was dried in air at a temperature of 60° C. to remove the solvent. The resulting product was then immersed in ethanol, all the solvent was extracted, and the product was dried in air at a temperature of 80° C. A layer of polyethylene 10 micrometers thick was thus formed in place and adhered to the porous expanded polytetrafluoroethylene membrane and a porous composite diaphragm material was produced.

Hydrophilization Treatment

The porous composite diaphragm material was treated as described in Example 1.

Cell

Test cells having electrodes in a spiral configuration were made. The treated porous composite diaphragm material was interposed between positive electrode material of manganese dioxide and negative electrode material of lithium metal with the porous polyethylene membrane in contact with the lithium metal electrode. The assembly was formed into a spiral configuration and manufacture of a cylindrical lithium cell completed by conventional methods. The electrolyte solution was a propylenecarbonate:1,2-dimethoxyethane (1:1) solution containing LiClO$_4$ (0.5M/liter).

COMPARATIVE EXAMPLE 6

Cylindrical lithium cells were made as comparative examples as described above as except that a porous stretched polyethylene membrane having a thickness of 25 micrometers, a maximum pore size of 0.25 micrometers, and a pore volume of 45 percent was used as the diaphragm. The diaphragm material of the comparative example was treated to make it hydrophilic as described in Example 1 above.

Testing

The short-circuit test described hereinabove was given to 1000 cells each made according to Example 6 and Comparative Example 6. The test results are as follows:

| Example | Shut-down Temperature | Failure rate |
| --- | --- | --- |
| Example 6 | 121° C. | 0% |
| Comp. Example 6 | 121° C. | 0.9% |

EXAMPLE 7

Diaphragm

A porous composite diaphragm material was made as follows:

Low density polyethylene was dissolved in a mixed solvent of xylene, decalin and DMSO (8:1:1) at a solution temperature of 120° C. and a solution containing 4 wt. % polyethylene was obtained. The solution was applied to only one side of a porous expanded polytetrafluoroethylene membrane having a thickness of 30 micrometers, a maximum pore size of 0.25 micrometers, and a pore volume of 40 percent. The porous expanded polytetrafluoroethylene membrane coated with the solution was dried in air at a temperature of 60° C. to remove the solvent. The resulting product was then immersed in ethanol, all the solvent was extracted, and the product was dried in air at a temperature of 80° C. A layer of polyethylene 20 micrometers thick was thus formed in place and adhered to the porous expanded polytetrafluoroethylene membrane and a porous composite diaphragm material was produced.

The porous composite diaphragm was then stretched 1.5 times its original length at a temperature of about 115° C. (about 6° C. lower than its melt-temperature).

Cell

Test cells having electrodes in a spiral configuration were made. The treated porous composite diaphragm material was interposed between positive electrode material of lithium cobaltate (LiCoO2) and negative electrode material of lithium-carbon with the porous polyethylene membrane in contact with the lithium-carbon electrode. The assembly was formed into a spiral configuration and manufacture of a cylindrical lithium cell completed by conventional methods. The electrolyte solution was a propylenecarbonate:diethylenecarbonate (1:1) solution containing LiClO4 (0.5M/liter).

COMPARATIVE EXAMPLE 7

Cylindrical lithium cells were made as comparative examples as described above as except that a porous stretched polyethylene membrane having a thickness of 25 micrometers, a maximum pore size of 0.25 micrometers, and a pore volume of 45 percent was used as the diaphragm.

Testing

The short-circuit test described hereinabove was given to 1000 cells each made according to Example 2 and Comparative Example 2. The test results are as follows:

| Example | Shut-down Temperature | Failure rate |
| --- | --- | --- |
| Example 7 | 121° C. | 0% |
| Comp. Example 7 | 121° C. | 0.9% |

EXAMPLE 8

Diaphragm

A porous composite diaphragm material was made as follows:

Low density polyethylene was dissolved in a mixed solvent of xylene and DMSO (9:1) at a solution temperature of 120° C. and a solution containing 2 wt. % polyethylene was obtained. The solution was applied to only one side of a porous expanded polytetrafluoroethylene membrane having a thickness of 15 micrometers, a maximum pore size of 0.25 micrometers, and a pore volume of 60 percent. The porous expanded polytetrafluoroethylene membrane coated with the solution was dried in air at a temperature of 60° C. to remove the solvent. The resulting product was then immersed in ethanol, all the solvent was extracted, and the product was dried in air at a temperature of 80° C. A layer of polyethylene 10 micrometers thick was thus formed in place and adhered to the porous expanded polytetrafluoroethylene membrane and a porous composite diaphragm material was produced.

Cell

Test cells having electrodes in a spiral configuration were made. The treated porous composite diaphragm material was interposed between positive electrode material of nickelic hydroxide and negative electrode material of cadmium metal. The assembly was formed into a spiral configuration and manufacture of a cylindrical nickel-cadmium cell completed by conventional methods. The electrolyte solution was 30% potassium hydroxide.

COMPARATIVE EXAMPLE 8

Cylindrical nickel-cadmium cells were made as comparative examples as described above as except that a porous non-woven cloth of Nylon 6/6 having a thickness of 75 micrometers was used as the diaphragm.

Testing

A cell made according to Example 8 and a cell made according to Comparative Example 8 were given the charge-discharge test described hereinabove.

The sample of Example 8 failed after about 4000 cycles, and the sample of Comparative Example failed after about 3000 cycles.

It is apparent from examination of the test data that the porous composite diaphragm material of the invention is a remarkable material that provides a much sought after reliable shut-down capability that safeguards against catastrophic failure that can result from short-circuits and high-rate discharges in lithium cells.

We claim:

1. An electrochemical cell diaphragm having an electrochemical reaction shut-down capability comprising of a porous composite material comprising:
   (a) a layer of porous fluoropolymer film in laminar arrangement with (b) a layer of porous thermoplastic polymer film,
said fluoropolymer having a melt temperature higher than said thermoplastic polymer melt temperature such that said porous fluoropolymer film remains intact at the melt temperature of said thermoplastic polymer;
said layer of porous thermoplastic polymer being sufficiently thick so that, when melted, a quantity of thermoplastic polymer forms a continuous non-porous barrier adhered to said porous fluoropolymer film,
whereby an electrochemical reaction across said diaphragm is shut down.

2. The composite porous material for a diaphragm for an electrochemical cell as recited in claim 1, wherein
the porous fluoropolymer film is selected from the class consisting of polyvinyl fluoride, polyvinylidene fluoride, polytrifluorochloroethylene, tetrafluoroethylene/(perfluoroalkyl) vinyl ether copolymer, tetrafluoroethylene/hexafluoropropylene copolymer, and polytetrafluoroethylene, and
the thermoplastic synthetic polymer film is a porous polyolefin film.

3. The composite porous material for a diaphragm for an electrochemical cell as recited in claim 2, wherein
the porous fluoropolymer film is a porous polytetrafluoroethylene film, and
the porous polyolefin film is selected from the class consisting of polyethylene and polypropylene.

4. The composite porous material for a diaphragm for an electrochemical cell as recited in claim 3, wherein the porous polytetrafluoroethylene film is a porous expanded polytetrafluoroethylene film.

5. The composite porous material for a diaphragm for an electrochemical cell as recited in claims 1, 2, 3, or 4 wherein the porous layer of thermoplastic synthetic polymer is formed in place on at least one side of the porous fluoropolymer film.

6. The composite porous material for a diaphragm for an electrochemical cell as recited in claims 1, 2, 3, or 4, wherein the porous layers are treated with a hydrophilic substance whereby their external and internal surfaces become hydrophilic.

7. The composite porous material for a diaphragm for an electrochemical cell as recited in claim 5, wherein the porous layers are treated with a hydrophilic substance whereby their external and internal surfaces become hydrophilic.

8. The composite porous material for a diaphragm for an electrochemical cell as recited in claim 6, wherein the hydrophilic substance comprises a copolymer of a fluorine-containing ethylenically unsaturated monomer and a non-fluorinated vinyl monomer containing a hydrophilic group.

9. The composite porous material for a diaphragm for an electrochemical cell as recited in claim 7, wherein the hydrophilic substance comprises a copolymer of a fluorine-containing ethylenically unsaturated monomer and a non-fluorinated vinyl monomer containing a hydrophilic group.

10. An electrochemical cell in which the composite material of claim 1 is used to separate the positive electrode and the negative electrode.

* * * * *